United States Patent [19]

Gobeil et al.

[11] 3,905,973

[45] Sept. 16, 1975

[54] THIOL METHYLATION WITH METHYL CHLORIDE

[75] Inventors: Richard John Gobeil; Frank Runar Haglid, both of Wilmington, Del.

[73] Assignee: E. I. Du Pont de Nemours and Company, Wilmington, Del.

[22] Filed: June 18, 1974

[21] Appl. No.: 480,409

Related U.S. Application Data

[63] Continuation-in-part of Ser. No. 417,069, Nov. 19, 1973, abandoned.

[52] U.S. Cl............................................. 260/248 AS
[51] Int. Cl.[2]........................................ C07D 253/06
[58] Field of Search............................... 260/248 AS

[56] References Cited
UNITED STATES PATENTS 3,135,737   6/1964   Restivo ........................... 260/248 X
3,671,523   6/1972   Westphal et al. ................... 260/248

*Primary Examiner*—John M. Ford

[57] ABSTRACT

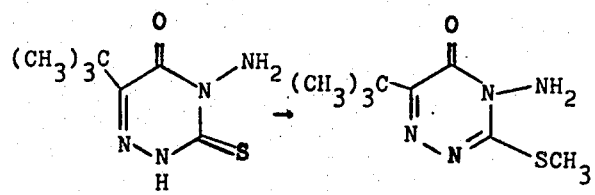

Compound A is methylated to produce compound B, in presence of a base in aqueous medium, using methyl chloride as alkylating agent and conducting the methylation in presence of sodium or potassium iodide.

4 Claims, No Drawings

3,905,973

THIOL METHYLATION WITH METHYL CHLORIDE

CROSS REFERENCE TO RELATED APPLICATION

This application is a continuation-in-part of my co-pending application Ser. No. 417,069, filed Nov. 19, 1973, now abandoned.

BACKGROUND OF THE INVENTION

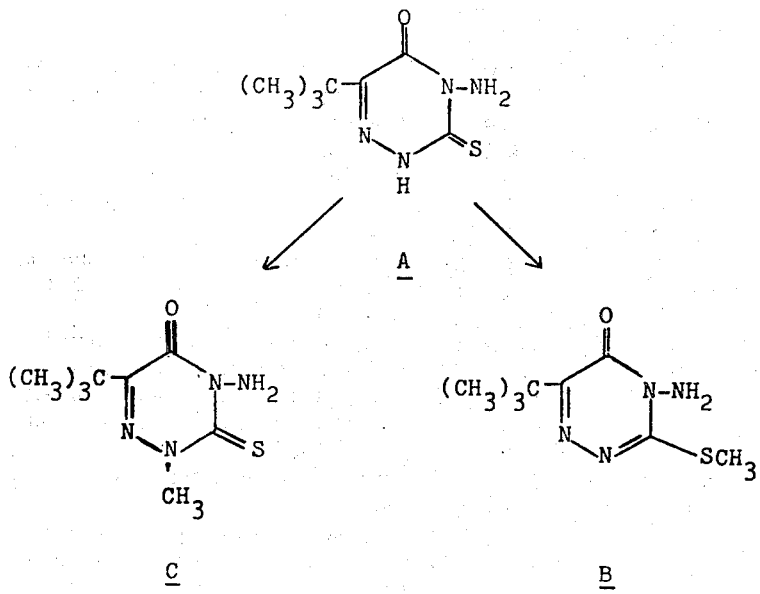

German Offenlegungsschrift No. 2,003,144 discloses the methylation of compound A to compound B, a selective herbicide, employing methyl iodide and sodium hydroxide in aqueous methanol. This reaction works well under a wide variety of conditions and generally only a small amount of the undesired by-product C is produced. However, the use of methyl iodide in large scale manufacturing is not practical because of its cost and limited availability. Therefore, alternative methylating agents were sought.

It was found that commonly-used, inexpensive methylating agents such as methyl chloride, dimethyl sulfate and trimethyl phosphate all yielded mixtures of B and C containing from 25 to 77 percent C depending on methylating agent and the reaction conditions used. Since B and C form 1:1 co-crystals, recovery of pure B from such mixtures can only be achieved with great loss of material.

SUMMARY OF THE INVENTION

It has now been found that methyl chloride can be used to methylate compound A to compound B in high yield, provided sodium iodide or potassium iodide is present. The combination of $CH_3Cl$ and NaI or KI is much less expensive than $CH_3I$; furthermore, $CH_3Cl$ is readily available in large quantities. The metal iodide is not consumed in the reaction and can be recycled. Therefore, the present invention makes practical the large scale production of compound B by methylation of compound A.

As stated above, the methylation of compound A to compound B with $CH_3I$ works well under a variety of conditions. For obtaining a high yield of compound B, the methylation with $CH_3Cl$ in presence of NaI or KI is much more dependent upon process parameters, especially solvent and temperature, as described below.

DESCRIPTION OF THE INVENTION

Process Parameters

Mole ratio of $CH_3Cl$ to compound A should be in the range of 1 to 1.5. Less $CH_3Cl$ gives incomplete reaction; more increases cost without process benefit, and can lead to side reactions. The preferred range is about 1.05 to 1.2.

Mole ratio of NaI or KI to $CH_3Cl$ should be in the range of 0.02 to 1. Less adversely affects the purity of the product; more increases the cost. The preferred range is about 0.1 to 0.5. NaI is preferred over KI because of cost.

Methyl chloride can be added all at once or gradually. Gradual addition is preferred because it increases the purity of the product.

The reaction is conducted in presence of a base. NaOH, $Na_2CO_3$, KOH, and $K_2CO_3$ are suitable. NaOH is preferred because of cost.

The reaction must be conducted in water or a mixture of water and an organic liquid in which the weight ratio of water to organic liquid is at least 60:40, preferably at least 75:25. Water alone is preferred. However, addition of a co-solvent can benefit the purity and physical properties of the product. Suitable organic liquids (cosolvents) include methanol, ethanol, isopropanol, acetone, methyl ethyl ketone, and dimethylformamide.

The reaction is conducted at a pH in the range of 7–14, preferably 10–12. Reaction temperature is in the range of 20°–50°C., preferably 30°–40°C. Pressure can be atmospheric or autogeneous. If a closed reactor is used, the autogenous pressure will depend upon mode of $CH_3Cl$ addition and solvent system used, as well as temperature. Use of atmospheric pressure requires a suitable condenser. Autogeneous pressure is preferred. Reaction time will be about 2–20 hours, depending upon the conditions used. Less than 2 hours can be used with some sacrifice of product purity and/or yield.

More than 20 hours can be used but is not necessary.

EXAMPLES

Example 1 illustrates the preferred embodiment of the invention. Examples 2 and 3 illustrate use of water/methanol and water/dimethylformamide media. Parts and percentages are by weight, except as otherwise noted.

EXAMPLE 1

In a pressure vessel provided with a stirrer and a heater was charged 40 of 4-amino-6-t-butyl-3-mercapto-1,2,4-triazin-5-one, 200 parts water, and 16.5 parts 50% sodium hydroxide and 10 parts sodium iodide. The resulting solution was stirred and heated to 35°C while 10.4 parts methyl chloride was added at 20 psi overpressure. The methyl chloride was consumed in 7 hours and the resulting slurry was then cooled to 10°C, filtered, washed with water and dried, yielding 40.3 parts 4-amino-6-t-butyl-3-methylthio-1,2,4-triazin-5-one, m.p. 120°–123°C. NMR analysis revealed the presence of around 2.5% of 4-amino-6-t-butyl-2-methyl-3-thio-1,2,4-triazin-3,5-dione in the product. The filtrate can then be concentrated, the less soluble sodium chloride filtered off, leaving nearly pure sodium iodide in the filtrate for use in a subsequent repeat run.

EXAMPLE 2

Using the same experimental setup as in Example 1 8 parts 4-amino-6-t-butyl-3-mercapto-1,2,4-triazin-5-one and 3.5 parts potassium iodide were dissolved in 21 parts 2N potassium hydroxide and 9 parts methanol and reacted with 2.4 parts methyl chloride at 25°C. The reaction was finished in 15 hours, yielding 7.8 parts of 4-amino-6-t-butyl-3-methylthio-1,2,4-triazin-5-one, m.p. 122°–124°C. Only a small amount of 4-amino-6-t-butyl-2-methyl-3-thio-1,2,4-triazin-3,5-dione was detected in the product.

EXAMPLE 3

Substituting dimethylformamide for methanol in Example 2 yielded 7.9 parts compound B with less than 3 percent of by-product compound C.

We claim:
1. In the process of synthesizing the compound

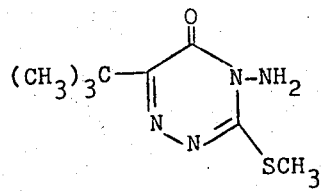

(B)

by methylating the compound

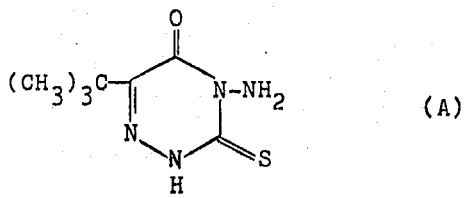

(A)

in the presence of a base in an aqueous medium, the improvement which comprises using methyl chloride as methylating agent and conducting the methylation in the presence of iodide ion.

2. Improved process of claim 1 wherein
   a. the mole ratio of methyl chloride to compound A is in the range of 1–1.5;
   b. the mole ratio of sodium or potassium iodide to methyl chloride is in the range of about 0.02–1;
   c. the methylation is conducted
      1. in water or a mixture of water and an organic liquid selected from methanol, ethanol, isopropanol, acetone, methyl ethyl ketone, and dimethylformamide, the weight ratio of water or organic liquid being at least 60:40;
      2. in presence of a base selected from the hydroxides and carbonates of sodium and potassium;
      3. at pH in the range 7–14, temperature in the range of 20°–50°C., and at atmospheric or autogenous pressure.

3. Improved process of claim 1 wherein
   a. the mole ratio of methyl chloride to compound A is in the range of about 1.05 to 1.2 and the methyl chloride is added to the reaction mixture gradually;
   b. the mole ratio of sodium or potasssium iodide to methyl chloride is in the range of about 0.1 to 0.5; and
   c. the methylation is conducted
      1. in water or a mixture of water and an organic liquid selected from methanol ethanol, isopropanol, acetone, methyl ethyl ketone and dimethylformamide, the weight ratio of water to organic liquid being at least 75:25;
      2. in presence of sodium hydroxide;
      3. pH in the range of about 10–12, temperature in the range of about 30°–40°C., and at autogenous pressure.

4. Improved process of claim 3 wherein the methylation is conducted in water.

* * * * *